Feb. 19, 1963

P. BROWN 3,077,742

BOAT HOUSE DRY DOCK

Filed Nov. 14, 1960

Philip Brown
INVENTOR.

Feb. 19, 1963 P. BROWN 3,077,742
BOAT HOUSE DRY DOCK
Filed Nov. 14, 1960 3 Sheets-Sheet 3
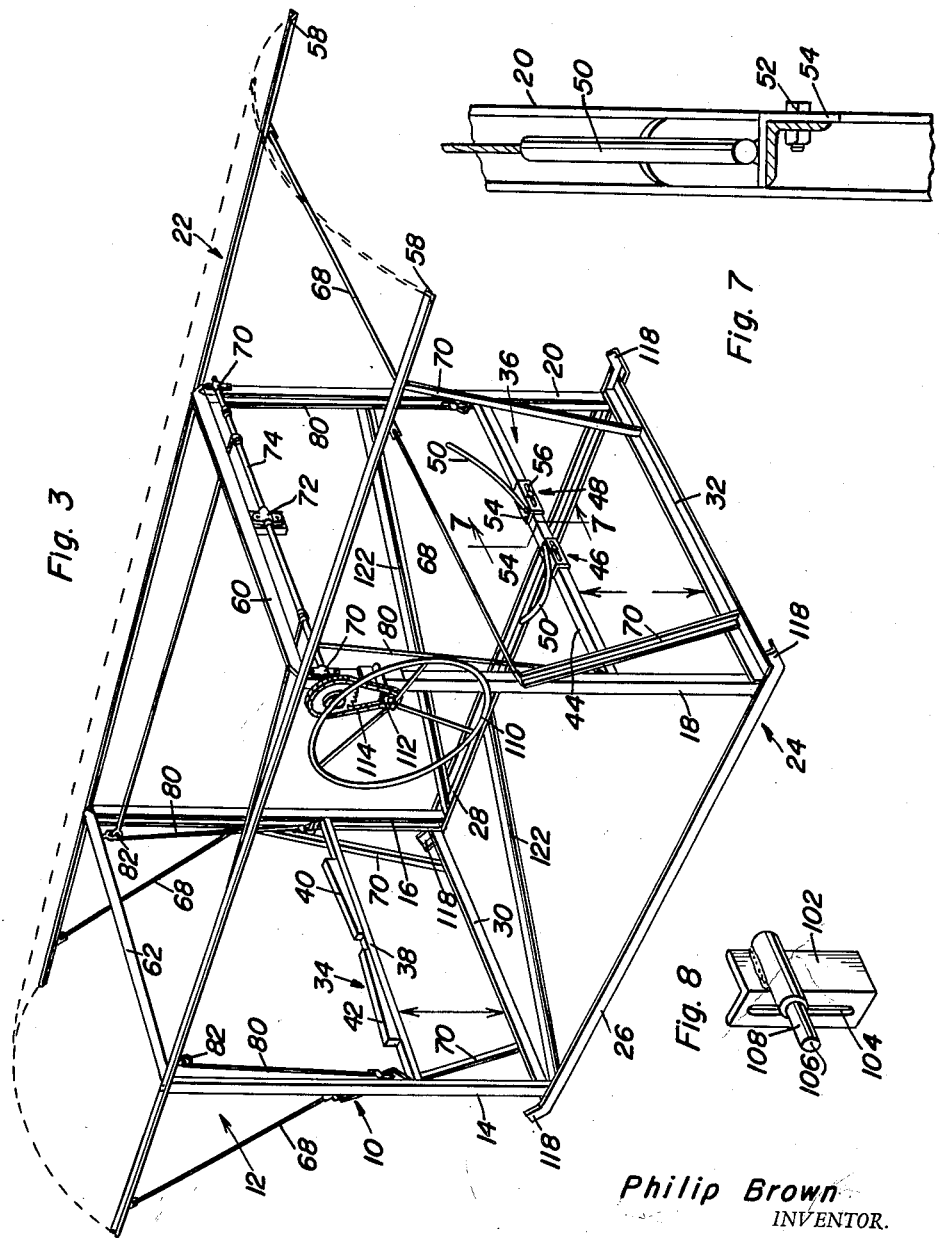
Philip Brown
INVENTOR.
BY *Clarence A. O'Brien
and Harvey B. Jacobson*
Attorneys

United States Patent Office 3,077,742
Patented Feb. 19, 1963

3,077,742
BOAT HOUSE DRY DOCK
Philip Brown, Main St., Keegan, Maine
Filed Nov. 14, 1960, Ser. No. 69,095
7 Claims. (Cl. 61—65)

This invention relates to a novel and useful boat house dry dock and more particularly to a boat house construction which is specifically adapted and provided with means for lifting a boat hull above the surface of a body of water in which the boat house construction is disposed.

Boating is fast becoming one of the major sports and while the novelty of a fast growing sport is still present and persons participating in this sport are buying boats and boating equipment without regard for the upkeep of such equipment, there will more than likely in the near future be more emphasis placed upon providing a means whereby the life expectancy of a boat and equipment therefor may be greatly extended.

Accordingly, it is the main object of this invention to provide a boat house and dry dock construction which may be utilized to store a boat hull and the boating equipment thereon in a position out of the water between each instance of the boat being used. While many types of boat constructions are presently being used in place of the more conventional wood construction and these newer types of construction are not as susceptible to damage by moisture, the effects of moisture, sun and wind on substantially every type of boat construction are detrimental to some extent. Accordingly, if a means is provided for storing a boat in a position out of the water and shaded from the sun, the boat will undoubtedly have a longer life expectancy and will maintain a new appearance look for a considerably longer period of time thus increasing the value of an older boat which has been stored in accordance with the present invention.

A further object of this invention is to provide a boat house dry dock which may be positioned in a body of water and rested upon the bottom thereof with the bottom of the body of water comprising the sole support for the boat house dry dock and being sufficient support for the boat house and dry dock while the latter is being used to store a boat in an elevated position above the surface of the body of water.

Still another object of this invention, in accordance with the preceding object, is to provide a boat house and dry dock construction which may readily be moved from place to place while being supported by the bottom of a body of water and which may readily be removed from the body of water during the off season months if it is desired.

A further object of this invention is to provide a boat house dry dock including front and rear pairs of opposite side uprights adapted to straddle a boat disposed therebetween with each pair of opposite side uprights being provided with cradle means extending therebetween adapted to support the undersurfaces of a hull of a boat on opposite sides of the keel thereof.

Still another object in accordance with the preceding object is to provide means interconnected between the upper ends of the pairs of opposite side uprights for raising and lowering the cradle means whereby a boat being supported thereby may be elevated to a position spaced a considerable distance above the body of water in which the boat house and the dry dock construction is disposed.

A final object to be specifically enumerated herein is to provide a boat house dry dock construction which will conform to conventional forms of manufacture, be of simple construction and easy to operate so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a perspective view of the boat house and dry dock, the arched roof construction thereof being shown in phantom lines;

FIGURE 6 is an enlarged fragmentary vertical sectional view of the boat house and dry dock construction showing the manner in which one end of one of the transverse cradle support members is mounted for sliding movement within one of the channel-shaped uprights.

FIGURE 7 is a fragmentary enlarged longitudinal vertical sectional view taken substantially upon the plane indicated by section line 7—7 of FIGURE 3.

FIGURE 8 is an enlarged perspective view of the mounting bracket for the hand wheel of the actuating means for raising and lowering the front and rear cradle support members; and FIGURE 9 is a perspective view of one of the roof bracing members.

Figure 1:
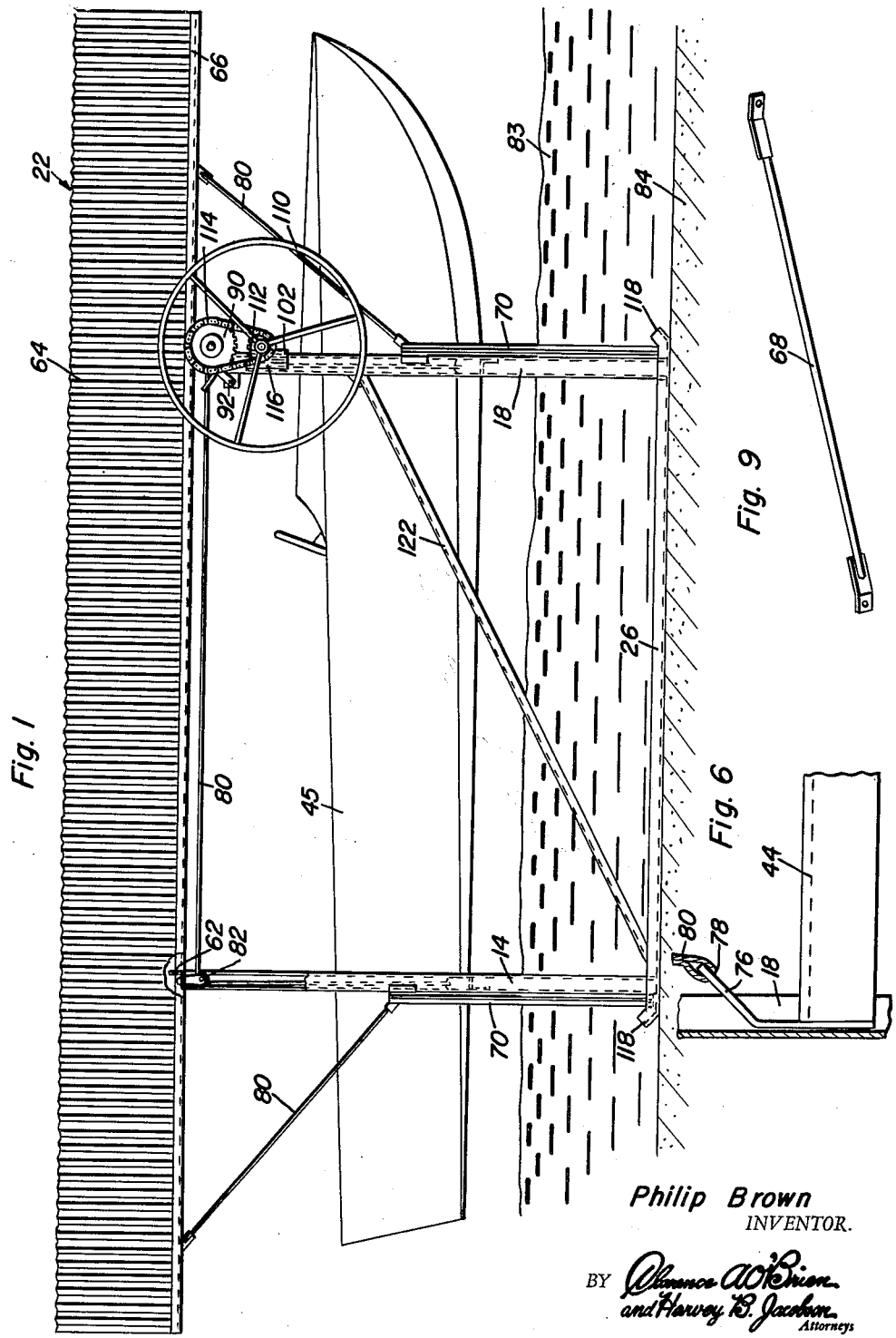
FIGURE 1 is a side elevational view of the boat house and dry dock construction shown supporting a conventional type of boat hull above the surface of the body of water in which the boat house and dry dock construction is disposed.
Figure 2:
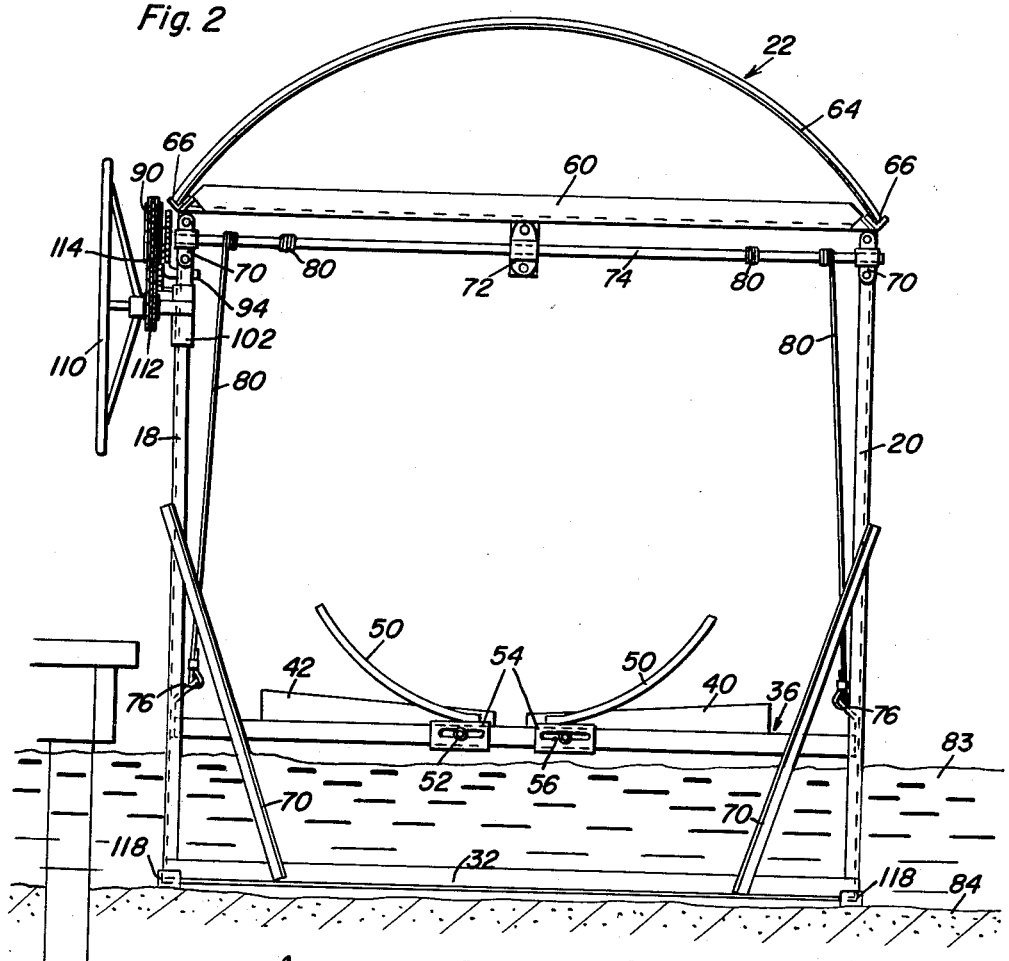
FIGURE 2 is an end elevational view of the boat house and dry dock construction as seen from the right side of FIGURE 1, the boat not being shown.

Referring now more specifically to the drawings, the numeral 10 generally designates the boat house and dry dock construction comprising the present invention which includes an open framework generally referred to by the reference numeral 12. The framework 12 consists of two pair of opposite side uprights 14 and 16 and 18 and 20 which are each channel-shaped and open toward the other upright of that pair of uprights. The upper ends of the uprights 14, 16, 18 and 20 are intinerconnected by means of a roof construction generally referred to by the reference numeral 22 and the lower ends thereof are interconnected by means of a lower frame assembly generally referred to by the reference numeral 24. The lower frame assembly 24 includes a pair of opposite side longitudinally extending skid runners 26 and 28 which are secured between the uprights 14 and 18 and 16 and 20 respectively. The lower frame assembly 24 also includes a pair of transverse frame members 30 and 32 interconnected between the uprights 14 and 16 and 18 and 20, respectively.

Extending between the uprights of each pair of uprights are a pair of cradle means generally referred by the reference numerals 34 and 36. The cradle means 34 includes a transverse cradle support member 38 which is generally L-shaped in cross section and whose opposite ends are slidably disposed between the uprights 14 and 16. The transverse cradle support 38 includes a pair of oppositely inclined, longitudinally aligned and spaced cradle blocks 40 and 42 adapted to engage the undersurfaces of the stern portion of the boat 45 on opposite sides of the keel thereof.

The forward cradle means 36 also includes a transverse cradle support member which is L-shaped in cross section that is generally referred to by the reference numeral 44. A pair of cradle arm members generally referred to by the reference numerals 46 and 48 are mounted on the transverse cradle support member 44 for adjustable movement longitudinally therealong.

Each of the cradle arm members includes an outwardly and upwardly curving arm element 50 which is adapted to engage the surface of the bow of the boat 45 on one side thereof.

With attention now directed more specifically to FIGURE 7 of the drawings, it will be noted that the transverse cradle support member 44 is provided with an aperture (not shown) through which a fastener 52 is secured. Each of the cradle arm members 46 and 48 includes a generally L-shaped base 54 provided with a longitudinally extending slot 56 therein for receiving the fastener 52 whereby the cradle arm members 46 and 48 may be adjustably positioned longitudinally of the transverse cradle support member 44.

The roof construction 22 includes a pair of generally V-shaped opposite side longitudinally extending members 58 and a pair of transversely extending support members 60 and 62. The members 58, 60 and 62 may of course be secured together in any convenient manner such as by bolting or welding. A roof member 64 formed of a corrugated material is bowed upwardly and has its opposite side edges 66 secured within the V-shaped longitudinally extending members 58 in any convenient manner. A plurality of roof support members 68 are secured between the uprights 14, 16, 18 and 20 and the corresponding ends of the opposite side members 58 of the roof construction 22 in order to provide a rigid roof construction.

Additionally, angulated bracing members 70 are secured between each of the uprights and the corresponding frame members 30 and 32 as can best be seen in FIGURE 3 of the drawings.

Rotatably journalled between the upper ends of the uprights 18 and 20 by means of a pair of journal supports 70 carried by the uprights 18 and 20 and a journal support 72 carried by the transverse support member 60 is a transverse shaft 74. Each of the transverse cradle support members 38 and 44 is provided with a pair of opposite end angulated hanger members 76, see FIGURE 6, whose upper end is apertured and has secured therethrough as at 78 one end of a flexible tension member 80. The tension members 80 secured to the opposite ends of the transverse cradle support member 44 have their other ends secured to the transverse shaft 74 whereby the tension members 80 will be wound about the shaft 74 upon rotation of the latter to raise and lower the transverse cradle support member 44. The tension members 80 secured to the opposite ends of the transverse cradle support member 38 are passed through pulley assemblies 82 carried by the rear transverse support member 62 and are also secured to the transverse shaft 74. Thus, it will be noted that rotation of the transverse shaft 74 will effect an equal and simultaneous raising or lowering of both of the transverse cradle support members 38 and 44 whereby the boat 45 being supported thereby may be raised and lowered relative to the surface of the body of water 83 whose bottom 84 is engaged by the lower frame assembly 24 of the boat house and dry dock construction 10.

One end of the shaft 74 projects beyond the upright 18 and is provided with a ratchet wheel 86 and a sprocket wheel 90. A generally U-shaped mounting member 92 is secured to the upright 18 in any convenient manner and is provided with aligned apertures (not shown) in the parallel legs thereof by which the angulated end portion 94 of the ratchet pawl member 96 is journalled for rotation. The ratchet pawl member 96 is provided with a tongue 98 on the free end thereof engageable with the teeth of the ratchet wheel 86 and an expansion spring 100 is secured between the ratchet pawl member 96 and the upright 18 for normally resiliently urging the tongue 98 into engagement with the teeth on the ratchet wheel 86.

With attention now directed to FIGURE 8 of the drawings there will be seen a generally L-shaped mounting member 102 provided with a longitudinally extending slot 104 in one leg thereof. A stub axle shaft 106 is secured to the other leg thereof and is provided with a diametrically reduced outer end portion 108 on which there is journalled a hand wheel 110 including a sprocket wheel 112 aligned with the sprocket wheel 90. An endless chain 114 is entrained about the aligned sprocket wheels 90 and 112 and it is to be noted that the mounting bracket 102 is mounted to the upright 18 by means of one or more fasteners 116, see FIGURE 1, similar to the manner in which the cradle arm members 46 and 48 are mounted on the transverse cradle support member 44.

The forward and rearward ends of the longitudinally extending skid runners 26 and 28 are turned upwardly as at 118 whereby the boat house and dry dock construction 10 may readily be drawn across the bottom 84.

Figure 4:
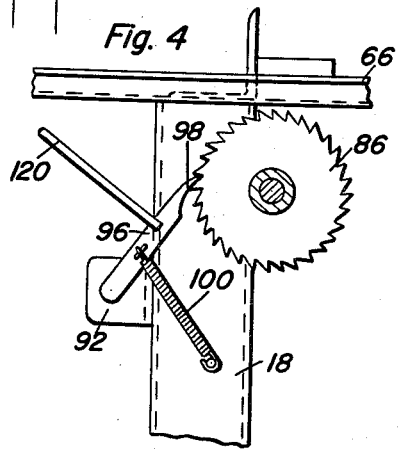
FIGURE 4 is a longitudinal vertical fragmentary sectional view on somewhat of an enlarged scale showing the details of the construction of the ratchet mechanism.
Figure 5:
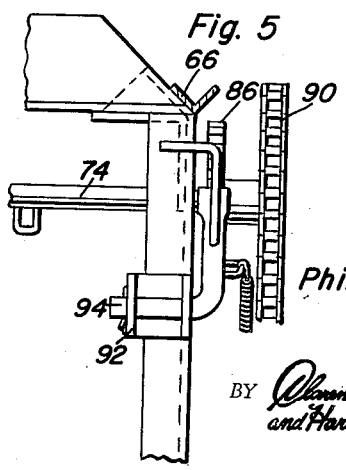
FIGURE 5 is an enlarged fragmentary sectional view of the boat house and dry dock construction showing the details of the construction of the ratchet mechanism as seen from the left side of FIGURE 4.

The ratchet pawl member 96 is provided with a handle 120 for effecting retraction of the tongue 98 from engagement with the ratchet wheel 86 to enable rotation of the ratchet wheel 86 in a counterclockwise direction as viewed in FIGURE 4 of the drawing which is normally prevented by means of the ratchet pawl member 96.

It is believed that the operation of the boat house and dry dock construction 10 will be apparent in that it may readily be seen that the cradle means 34 and 36 may be lowered upon rotation of the hand wheel 110 and retraction of the ratchet pawl member 96. The boat 45 is then positioned above the submerged cradle means 34 and 36 and the hand wheel 110 is then rotated in a clockwise direction as viewed in FIGURES 1 and 3 to raise the cradle means 34 and 36 into engagement with the lower surfaces of the boat 45 whereupon the boat 45 will be lifted clear of the surface of the body of water 83 to substantially the position illustrated in FIGURE 1 of the drawings. The roof construction 22 provides a means for shielding the boat 45 from the harmful effects of direct sunlight and rain and if it is desired the boat 45 may be raised to a position higher than that shown in FIGURE 1 of the drawings and side walls may be provided for the boat house and dry dock construction 10 in order to minimize the effect of wind on the boat 45.

When it is desired to remove the boat house and dry dock construction 10 from the body of water 83 at the end of the season, a tension member of suitable material may be tied to one of the transverse members 30 and 32 of the lower frame assembly 24 in order that the boat house and dry dock construction may be dragged along the bottom 84 and out of the water 83. Thus, at the end of the boating season the boat house and dry dock construction 10 may be removed from the water in order to minimize the detrimental effects of water on the boat house and dry dock construction and also in order that the parts thereof normally disposed beneath the surface of the body of water 83 may be inspected for corrosion in order that suitable steps may be taken to retard the same.

The framework 12 may be provided with various bracing members such as members 122 for providing rigid bracing of the framework 12. The members 122, see FIGURES 1 and 3, are secured between uprights 18 and the skid runners 26 in any convenient manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A boat house dry dock comprising a mounting frame including longitudinally spaced front and rear pairs of opposite side uprights adapted to straddle a boat hull disposed therebetween, front and rear transversely extending cradle means adapted to support the under surfaces of a hull, means suspending said front and rear cradle means between said front and rear pairs of uprights respectively, and means carried by each of said pairs of uprights slidably guiding the opposite ends of the corresponding cradle means disposed therebetween for guided rectilinear movement along said uprights, and actuating means connected with both of said cradle means for effecting simultaneous and substantially equal raising and lowering of said cradle means relative to said uprights, said suspension means for said front cradle means including a transverse shaft journalled between the upper portions of the uprights of the corresponding pair thereof, and flexible tension member connected between the opposite ends of said front cradle means and like ends of said shaft, and drive means connected to one end of said shaft for effecting rotation of said shaft and disposed along one side of said dry dock, said suspension means for said rear cradle means including a support member secured between the upper ends of the corresponding pairs of uprights, guide means carried by said support member, and flexible tension members connected between the opposite ends of said rear cradle means and corresponding opposite ends of said shaft with the intermediate portions thereof laterally deflected and passed through said guide means.

2. The combination of claim 1 wherein said rear cradle means comprise a transverse cradle support member, a pair of oppositely inclined, aligned and spaced apart cradle blocks carried by said rear cradle support member adapted to engage the under surfaces of the stern of a hull on opposite sides of the keel thereof.

3. The combination of claim 1 wherein said front cradle means comprises a transverse cradle support member, a pair of cradle arm members, means securing said cradle arm members to said front transverse cradle support member for adjustable movement therealong, said cradle arm member each including an outwardly and upwardly curving arm element adapted to engage the surfaces of the bow of a hull on one side thereof.

4. The combination of claim 1 wherein said rear cradle means comprise a transverse cradle support member, a pair of oppositely inclined, aligned and spaced apart cradle blocks carried by said rear cradle support member adapted to engage the under surfaces of the stern of a hull on opposite sides of the keel thereof, said front cradle means comprising a transverse cradle support member, a pair of cradle arm members, means securing said cradle arm members to said front transverse cradle support member for adjustable movement therealong, said cradle arm member each including an outwardly and upwardly curving arm element adapted to engage the surfaces of the bow of a hull on one side thereof.

5. The combination of claim 1 wherein said means for effecting rotation of said shaft, comprising a hand wheel operatively connected thereto, and a releasable ratchet mechanism operatively connected to said shaft for preventing rotation of said shaft in one direction.

6. The combination of claim 1 wherein each of said uprights includes a channel member opening toward the other channel member of that pair of uprights, said cradle means each including a transverse cradle support member, the opposite ends of each of said cradle support members being slidably received in the corresponding channel member comprising said slidable guiding means.

7. The combination of claim 1 including a roof structure over said dry dock interconnecting the upper ends of said uprights bearing means carried by said roof structure journalling a portion of said shaft between said front uprights.

References Cited in the file of this patent

UNITED STATES PATENTS

| | | |
|---|---|---|
| 265,560 | Ball et al. | Oct. 10, 1882 |
| 296,856 | Livingston | Apr. 15, 1884 |
| 779,600 | Hickler | Jan. 10, 1905 |
| 813,915 | Robinson | Feb. 27, 1906 |
| 821,954 | McCormick | May 29, 1906 |
| 2,505,832 | Lange | May 2, 1950 |
| 2,579,681 | Leitner | Dec. 25, 1951 |
| 2,708,346 | Smith | May 17, 1955 |
| 2,889,062 | Stearn | June 2, 1959 |